United States Patent
Chang

(10) Patent No.: US 10,279,689 B2
(45) Date of Patent: May 7, 2019

(54) BATTERY RESCUE ACTIVATING RESET DEVICE

(71) Applicant: Yi-Fan Chang, New Taipei (TW)

(72) Inventor: Yi-Fan Chang, New Taipei (TW)

(*) Notice: Subject to any disclaimer, the term of this patent is extended or adjusted under 35 U.S.C. 154(b) by 355 days.

(21) Appl. No.: 15/161,224

(22) Filed: May 21, 2016

(65) Prior Publication Data
US 2017/0334299 A1 Nov. 23, 2017

(51) Int. Cl.
*H01M 10/46* (2006.01)
*B60L 11/18* (2006.01)
*H01M 10/42* (2006.01)
*H02J 1/06* (2006.01)
*H02J 1/00* (2006.01)

(52) U.S. Cl.
CPC ......... *B60L 11/1816* (2013.01); *H01M 10/42* (2013.01); *H01M 10/46* (2013.01); *H02J 1/06* (2013.01); *H01M 2220/20* (2013.01); *H02J 2001/006* (2013.01)

(58) Field of Classification Search
CPC ...... H02J 7/0026; H02J 7/0021; H02J 7/0029; H02J 7/0034; H02J 7/0036; H02J 7/355; H02J 7/0042
USPC .......................... 320/103, 104, 105, 114, 115
See application file for complete search history.

(56) References Cited

U.S. PATENT DOCUMENTS

| | | | | |
|---|---|---|---|---|
| 4,871,957 A * | 10/1989 | Taranto | ................... | H01R 11/24 320/105 |
| 5,230,637 A * | 7/1993 | Weber | ................... | H01R 11/24 320/105 |
| 5,635,817 A * | 6/1997 | Shiska | ................... | H02G 11/02 320/105 |
| 5,795,182 A * | 8/1998 | Jacob | ................... | H02J 7/0034 439/490 |
| 2002/0057542 A1* | 5/2002 | Colling | ................... | B60K 28/14 361/52 |
| 2010/0283623 A1* | 11/2010 | Baxter | ................. | H01R 13/641 340/687 |
| 2016/0181587 A1* | 6/2016 | Koebler | ................... | H01M 2/34 429/7 |

* cited by examiner

*Primary Examiner* — Edward Tso

(57) ABSTRACT

The present invention is a battery rescue activating reset device, used for powering a preset battery, the reset device including: a power supplier, a control circuit, an anode connection line, a cathode connection line and a connection line used for resetting. The control circuit includes an electric switch used for switch the power supplier to power the battery, when the anode connection line is connected to the anode end of the battery, or the cathode connection line is connected to the cathode end of the battery, then the connection line used for resetting is connected to both the anode end or the cathode end of the battery, and when the anode connection line is not connected to the anode end of the battery, or the cathode connection line is not connected to the cathode end of the battery, then meanwhile the connection line used for resetting is not connected to the anode end or the cathode end of the battery, making the electric switch closed.

6 Claims, 5 Drawing Sheets

BATTERY RESCUE ACTIVATING RESET DEVICE

FIELD OF THE INVENTION

The present invention relatives to a reset device, and particularly to a battery rescue activating reset device using a connection line used for resetting to reset an electric switch to avoid inappropriate operation resulting in incorrect action.

BACKGROUND OF THE INVENTION

Vehicles such as cars or motorcycles are usually equipped with a battery in order to provide electric power. When a user is driving a car or riding a motorcycle, the operating engine of the car or the motorcycle would charge the battery. When the car or the motorcycle consumes electricity, for example to start the motor, the headlight, the car stereo system, the air conditioner, etc, electric power is supplied by the battery.

If a driver forgets to turn off the headlight, the night light, or any other electric device on a vehicle which consumes electricity before leaving the vehicle, the electric power of the battery may be exhausted and the vehicle may be unable to start because the battery continues to provide electricity without being charged. When this happens, a driver may activate the vehicle with the help of another vehicle's battery. This, however, requires a power line to connect the two batteries. Furthermore, the power line needs to be connected to the correct electrodes of the two batteries; otherwise there may be risk of short circuit.

Emergency vehicle rescue device has been invented, which includes an electric circuit for automatically detecting the electrode of a vehicle battery. When a vehicle battery is over-discharged and cannot be started, the emergency vehicle rescue device may be used to electrically connect the two conductive terminals of the battery and provide enough power for the vehicle to start.

However, the above-mentioned emergency vehicle rescue device has the following problems and disadvantages:

Because the relay is characterized of high current loading, a control circuit of such emergency car emergency rescue device uses relay as a switch for the emergency car rescue device to power the vehicle battery. When the user connects an anode connection line and a cathode connection line of the emergency car rescue device respectively to an anode end and a cathode end of the vehicle battery, the relay is turned on to power the vehicle battery. But when the user takes the anode connection line and the cathode connection line of the emergency car rescue device away from the anode end and cathode end of the vehicle battery, then the relay keeps being turned on.

However, when the relay keeps being turned on and is not able to be reset, if the user connects the anode connection line and the cathode connection line of the emergency car rescue device respectively to the anode end and the cathode end of the vehicle battery again, because the relay keeps being turned on, then spark may happen on the relay because of the large instant current, and the lifetime of the relay would thus decrease. Further, if the user connects the anode connection line and the cathode connection line of the emergency car rescue device respectively to the cathode end and the anode end of the vehicle battery, this is incorrect connection, because the relay keeps being turned on and powers the wrong vehicle battery, the dangerous short is happened.

To solve the aforementioned problem, it is thought about how the relay is reset to be closed when the user takes the anode connection line and the cathode connection line of the emergency car rescue device away from the anode end and cathode end of the vehicle battery. In the existing technology, two methods: hardware reset and software reset are often used. Wherein, in the hardware reset, a manual switch is disposed in the emergency car rescue device. When the user switches to the manual switch, the relay is reset. However, though the method indeed can solve the problem of the reset of relay, but it is not intuitive and humanized enough. While in the software reset, an automatic program is programmed in a micro processor of the control circuit, in order to set the relay to reset a time per few seconds by the program, such as two seconds. However, although the method naturally solve the problem of resetting the relay, the user does not need to operate manually. But when the user connects the anode connection line and the cathode connection line of the emergency car rescue device to the vehicle battery in two seconds, the same problem as mentioned above is happened.

Therefore, it is an purpose for the inventor and the skilled people in the field to research in order to improve, and solve the problem and disadvantage of the prior art.

SUMMARY OF THE INVENTION

Therefore, in view of the aforementioned disadvantages, the inventor of the present invention collects relative data, continuously tries and modifies in order to design the patent with evaluation and consideration in many aspects, and experience of years.

A purpose of the present invention is providing a battery rescue activating reset device using a connection line used for resetting to reset an electric switch in order to avoid an inappropriate operation resulting in incorrect action.

In order to achieve the purpose aforementioned and the like, the present invention provides a battery rescue activating reset device, used for powering a battery, the reset device including: a power supplier; a control circuit, connected to the power supplier, used for controlling the power supplier to power the battery or not, including an electric switch, used for switching the power supplier to power the battery; an anode connection line and a cathode connection line, connected to the control circuit at an end, the other end of the anode connection line is used for being connected to an anode end of the battery, the other end of the cathode connection line is used for being connected to a cathode end of the battery; and a connection line used for resetting, which is an end connected to the control circuit, the end correspondingly disposed the other end of the anode connection line or the other end of the cathode connection line, when the anode connection line is connected to the anode end of the battery, or the cathode connection line is connected to the cathode end of the battery, then the connection line used for resetting is connected to both the anode end or the cathode end of the battery, and when the anode connection line is not connected to the anode end of the battery, or the cathode connection line is not connected to the cathode end of the battery, then meanwhile the connection line used for resetting is not connected to the anode end or the cathode end of the battery, making the electric switch closed.

In a preferred embodiment, the battery is an activating battery of vehicle.

In a preferred embodiment, the reset device includes a case, the control circuit is housed in the case.

In a preferred embodiment, the anode connection line is connected to the anode end of the battery by an anode fixture.

In a preferred embodiment, the cathode connection line is connected to the cathode end of the battery by a cathode fixture.

In a preferred embodiment, the electric switch is a relay.

Wherein, because the present invention includes a reset connection line, an end of the connection line used for resetting is connected to the control circuit, the other end is correspondingly disposed at the other end of the anode connection line, or the other end of the cathode connection line. When the anode connection line is not connected to the anode end of the battery, or the cathode connection line is not connected to the cathode end of the battery, then meanwhile the connection line used for resetting is not connected to the anode end or the cathode end of the battery, such that the electric switch is not conductive. In this way, in the present invention, when the anode connection line or the cathode connection line is taken away from the battery, the electric switch is reset at the same time, and an inappropriate operation resulting in incorrect action can be avoided.

BRIEF DESCRIPTION OF THE DRAWINGS

The accompanying drawings are included in order to provide a further understanding of the invention, and are incorporated in and constitute a part of this specification. The drawings illustrate embodiments of the invention and, conjugated with the description, serve to explain the principles of the invention.

DETAILED DESCRIPTION OF THE PREFERRED EMBODIMENTS

Figure 1:
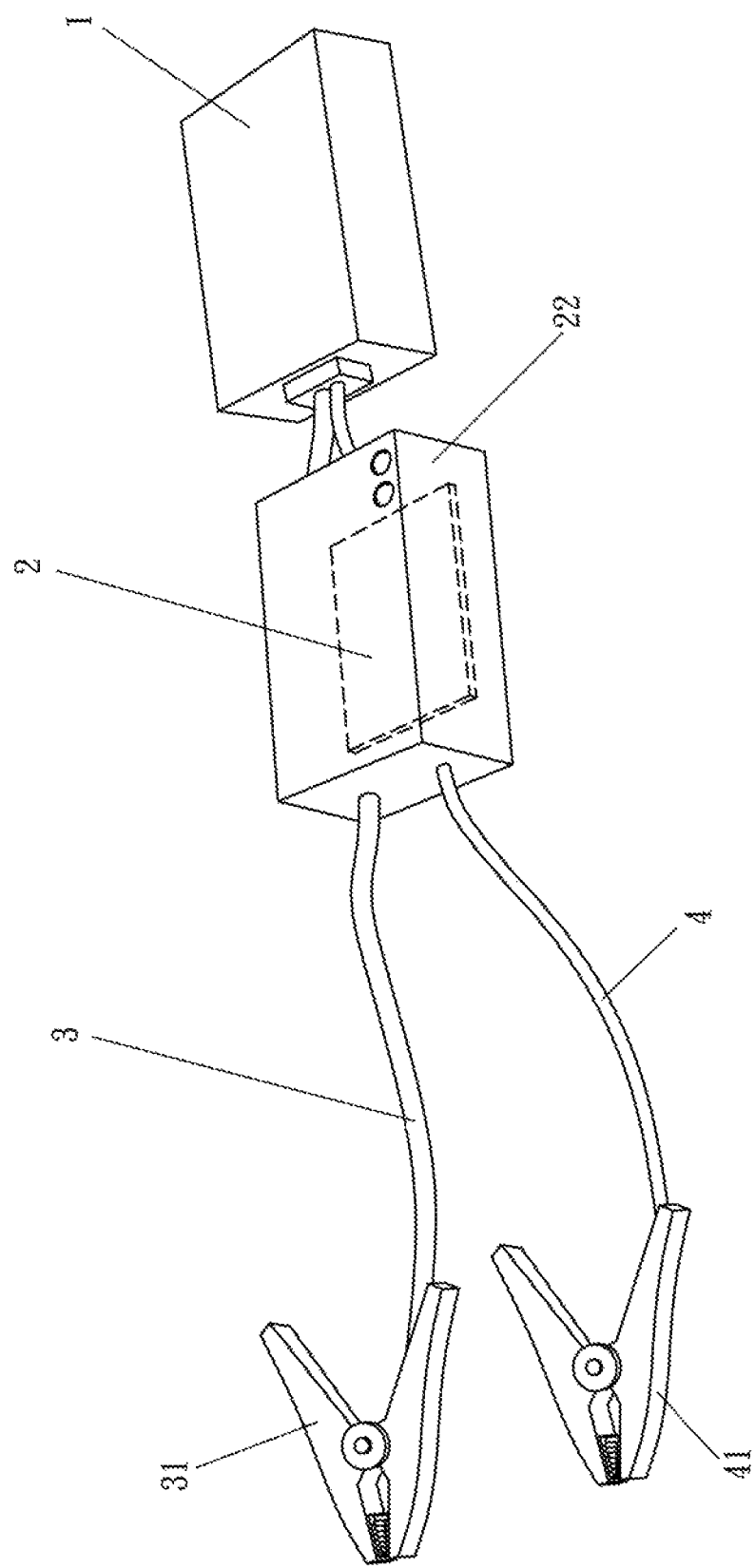
FIG. 1 illustrates a diagram of a perspective view of the battery rescue activating reset device according to a preferred embodiment of the present invention.

To achieve the above-mentioned purpose and effects, the techniques, measurements, and structure of the present invention is illustrated in the drawings and the descriptions of preferred embodiments below.

Figure 2:
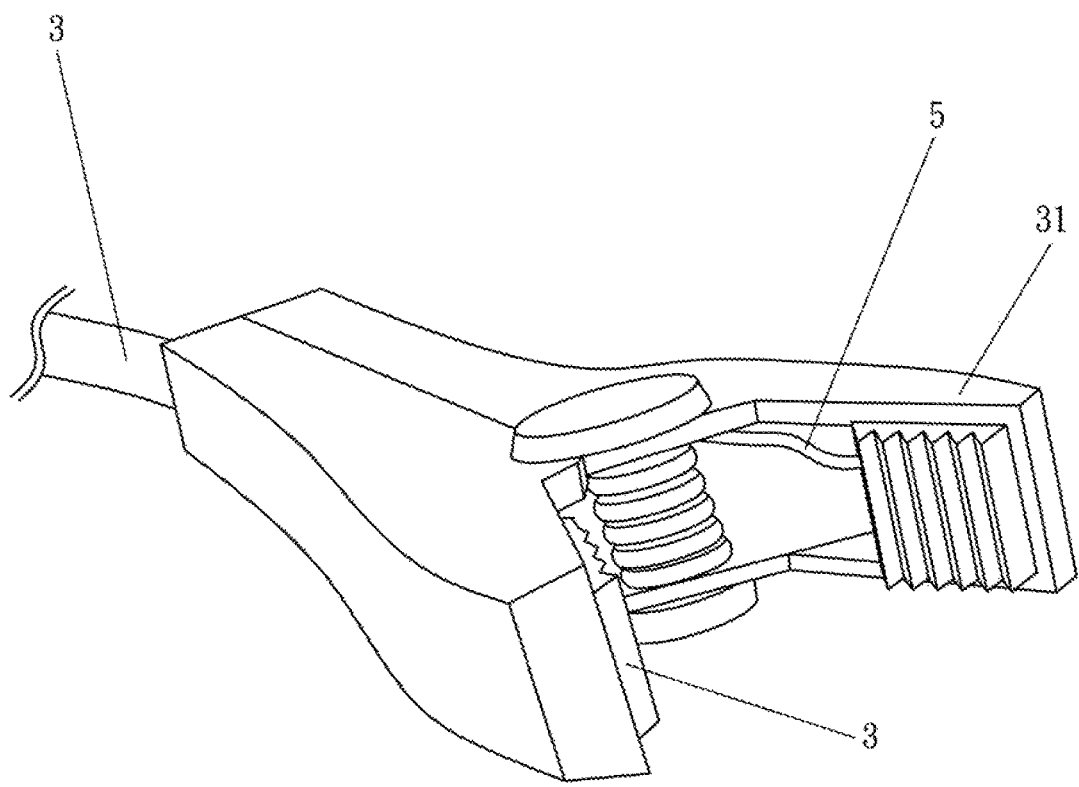
FIG. 2 illustrates a second diagram of a perspective view of the battery rescue activating reset device according to a preferred embodiment of the present invention.
Figure 3:
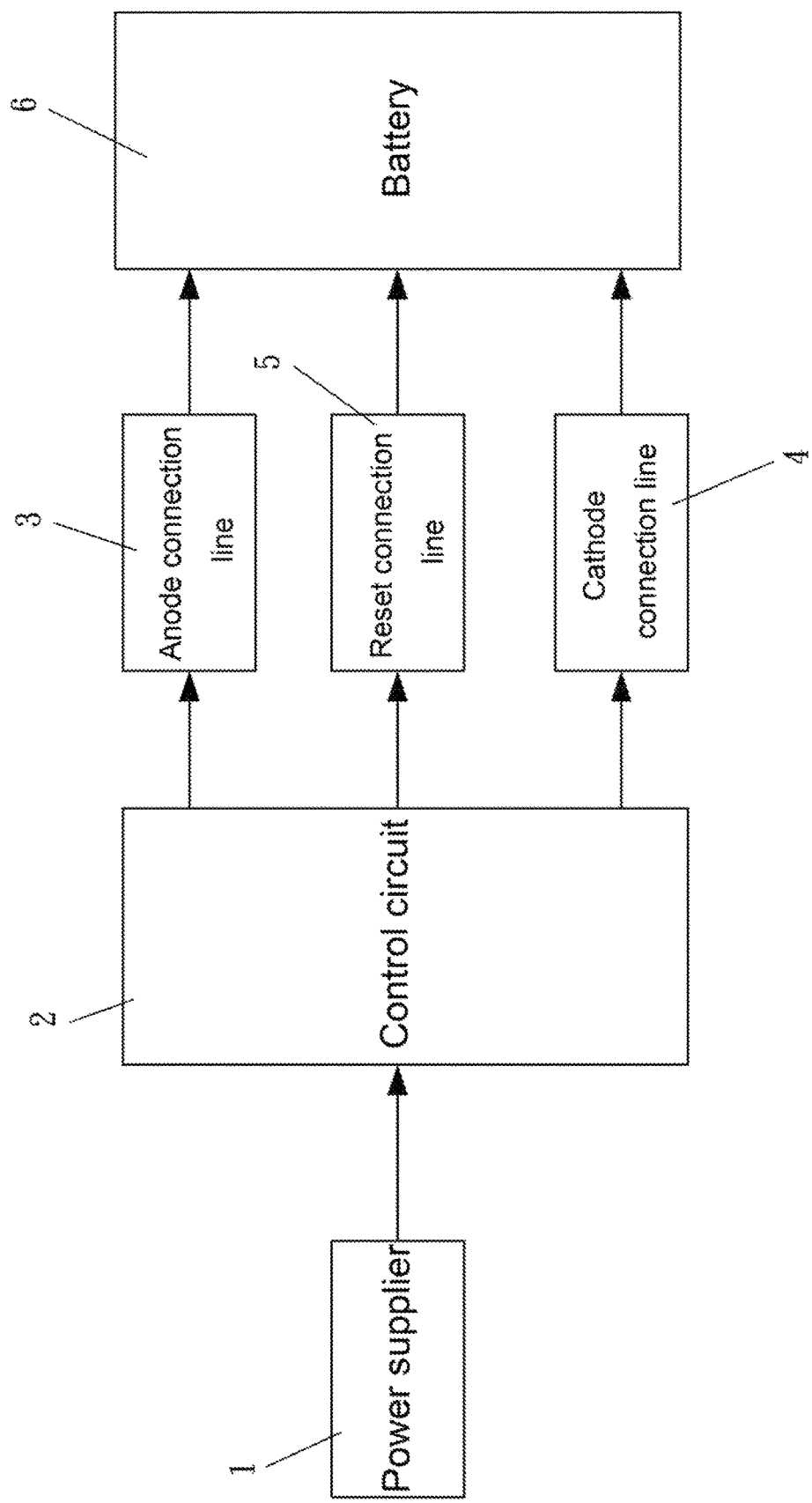
FIG. 3 illustrates a block diagram of the battery rescue activating reset device according to a preferred embodiment of the present invention.

Please refer to FIGS. 1, 2 and 3, it can be seen clearly that, the present invention provides a battery rescue activating reset device, used for powering a battery 6. Preferably, the battery 6 can be an activating battery 6 of vehicle, but not limited to this. The vehicle can be a motorcycle, car, wagon or truck etc., but not limited to this. The reset device includes: a power supplier 1, a control circuit 2, an anode connection line 3, a cathode connection line 4 and a connection line used for resetting 5.

Preferably, the power supplier 1 is a rechargeable lithium battery 6. The output specification of the power supplier 1 can be adjusted according to the actual use, that is, being adjusted according to the specification of the battery 6 of the vehicle, for example: the output voltage can be DC 12V, the maximum output current is 600 A. In this way, the rescue reset device of the activating battery 6 of the present invention can power the activating battery 6.

The control circuit 2 is connected to the power supplier 1, used for controlling the power supplier 1 in order to power the battery 6 or not. Preferably, the control circuit 2 would include a chip micro controller (not shown), the condition program used for controlling the power supplier 1 to power the battery 6 or not is programmed in the chip micro controller in advance. The control circuit 2 includes an electric switch 21, used for switching the power supplier 1 in order to power the battery 6. Wherein, the electric switch 21 can be an electric switch element like a relay, transistor, but not limited to this. Because the electric switch 21 can load large current thus selected to be the switch of the present invention. When the electric switch 21 is turned on, then the power supplier 1 can power the battery 6. When the electric switch 21 is not conductive, then the power supplier 1 does not power the battery 6.

Moreover, the reset device of the present invention further includes a case 22, the control circuit 2 is housed in the case 22. Preferably, two indication lights are disposed on the case 22, the two indication lights are respectively connected to the control circuit 2, used for displaying whether the reset device powering the battery 6 or not.

An end of the anode connection line 3 is connected to the control circuit 2, the other end is used for connecting the anode end 61 of the battery 6. And an end of the cathode connection line 4 is connected to the control circuit 2, the other end is used for connecting the cathode end 62 of the battery 6. Preferably, the anode connection line 3 is connected to the anode end 61 of the battery 6 by an anode fixture 31. The cathode connection line 4 is connected to the cathode end 62 of the battery 6 by a cathode fixture 41. The anode fixture 31 and the cathode fixture 41 are used for fixing the anode end 61 and the cathode end 62 of the battery 6.

An end of the connection line used for resetting 5 is connected to the control circuit 2, the other end is correspondingly disposed at the other end the anode of the connection line 3, or the other end of the cathode connection line 4. Preferably, when the anode connection line 3 is not connected to the anode end 61 of the battery 6, or the cathode connection line 4 is not connected to the cathode end 62 of the battery 6, the other end of the reset connection line 5 is connected to the anode connection line 3 or the cathode connection line 4. Alternatively, when the anode connection line 3 is not connected to the anode end 61 of the battery 6, or the cathode connection line 4 is not connected to the cathode end 62 of the battery 6, the other end of the connection line used for resetting 5 is not connected to the anode connection line 3 or the cathode connection line 4. That is, the other end of the connection line used for resetting 5 can be connected or not connected to the anode connection line 3 or the cathode connection line 4. Please refer to FIG. 2, as shown in FIG. 2, the connection line used for resetting 5 is disposed at a fixture of the anode fixture 31, the anode connection line 3 is disposed at the other fixture corresponding to the anode fixture 31.

By the aforementioned structure, composed design, the operation by using the present invention is described in the following: please refer to both FIGS. 4 and 5, as shown, the rescue activating reset device of the battery 6 of the present invention is used for powering a battery 6. For example, when powering a battery 6 of a vehicle, it requires that the anode connection line 3 of the reset device is connected to the anode end 61 of the battery 6, the cathode connection line 4 of the reset device is used for connecting the cathode end 62 of the battery 6. When the connection is completed, the electric switch 21 is controlled to be turned on by the control circuit 2, in order to control the power supplier 1 to power the battery 6. Further, when the anode connection line 3 is connected to the anode end 61 of the battery 6, or the cathode connection line 4 is connected to the cathode end 62 of the battery 6, then the connection line used for resetting 5 is also connected to the anode end 61 or the cathode end 62 of the battery 6.

Additionally, when the anode connection line 3 is not connected to the anode end 61 of the battery 6, or the cathode connection line 4 is not connected to the cathode end 62 of the battery 6, then the connection line used for resetting 5 is not connected to the anode end 61 or the cathode end 62 of the battery 6, that is, when the battery 6 of the vehicle to be rescued by the user has already been activated, the anode connection line 3 and the cathode connection line 4 are taken off. Then the connection line used for resetting 5 meanwhile is not connected to the anode end 61 or the cathode end 62 of the battery 6, making the electric switch 21 is not conductive.

Figure 4:
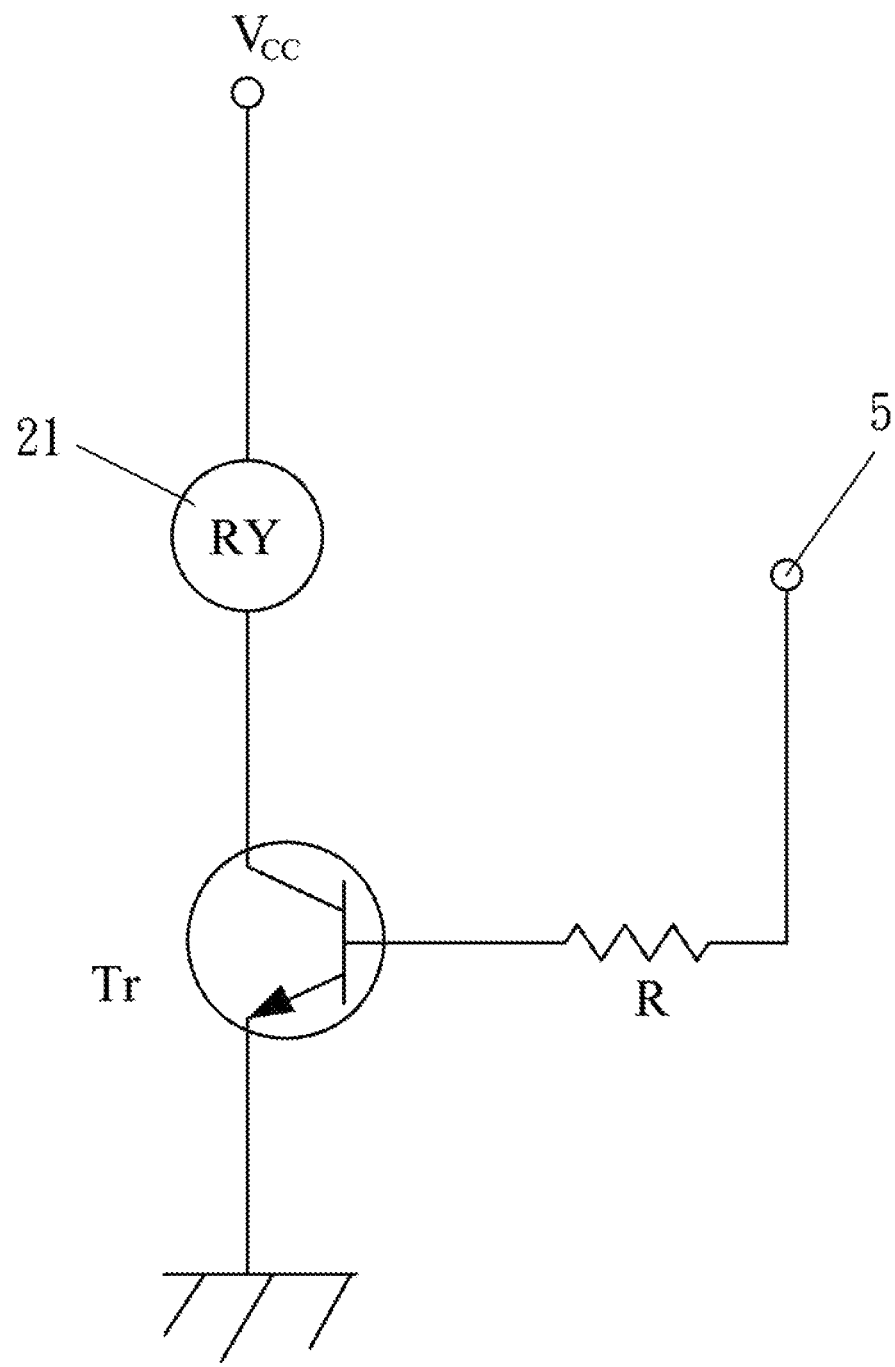
FIG. 4 illustrates a circuit diagram of the battery rescue activating reset device according to a preferred embodiment of the present invention.
Figure 5:
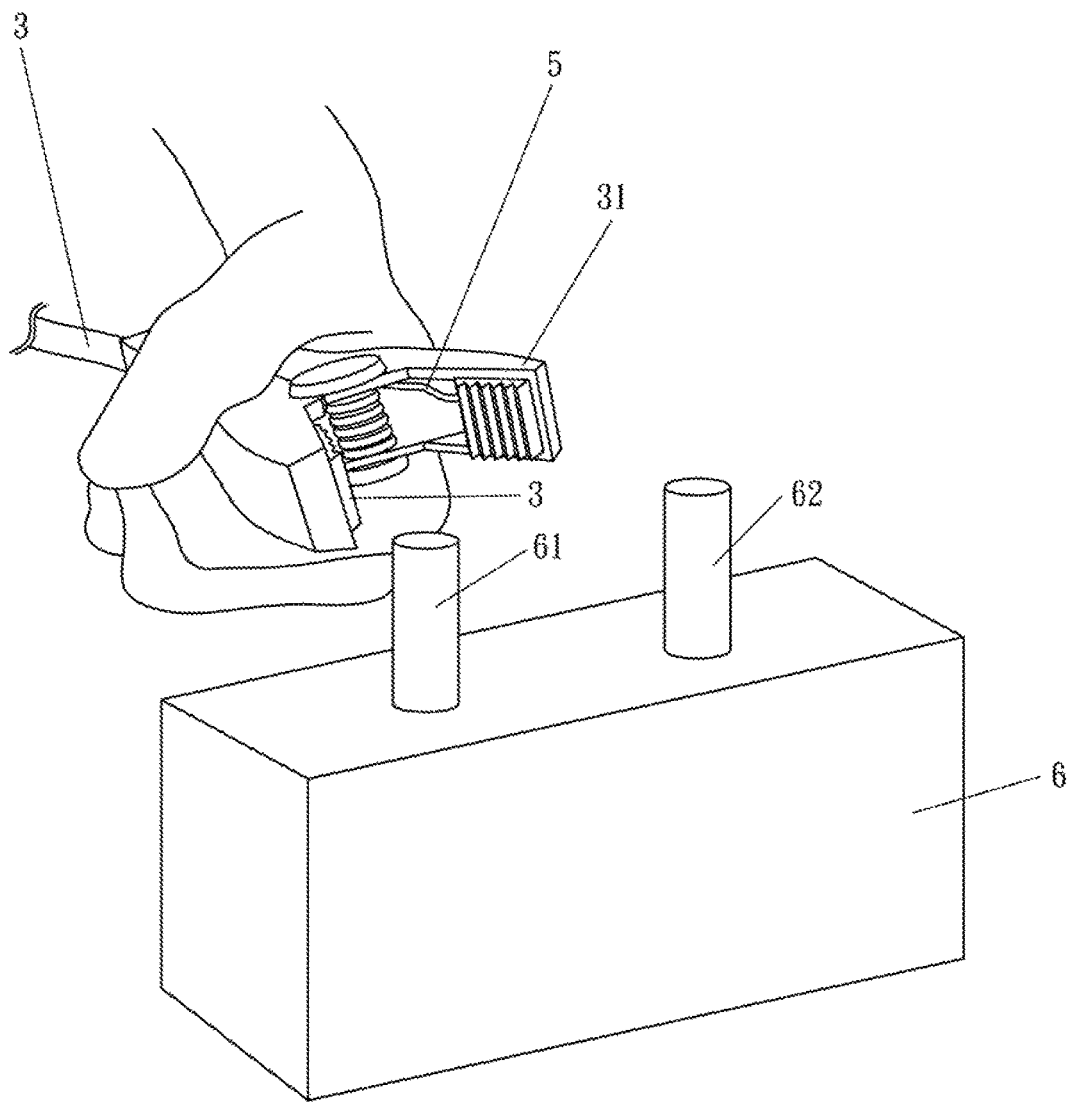
FIG. 5 illustrates a diagram of the battery rescue activating reset device according to a preferred embodiment of the present invention.

The principle is shown in FIG. 4, FIG. 4 is a circuit diagram of actual usage, the connection line used for resetting 5 is connected to a resistor R, the resistor R is connected to a base electrode of a transistor Tr, the emitting electrode of the transistor Tr is connected to the ground, the drain electrode is connected to an end of the electric switch 21, preferably, the electric switch 22 is a relay RY, the other end of the electric switch 21 is connected to the power Vcc. Wherein, when the connection line used for resetting 5 meanwhile is not connected to the anode end 61 or the cathode end 62 of the battery 6. Because no current passes the connection line used for resetting 5, thus, no current passes between the base electrode and emitting electrode of the transistor Tr used as the switch, and the transistor Tr is turned off, resulting in that the electric switch 21 is not conductive.

Thus, please refer to the all attached diagrams, when the present invention is used, compared with the prior art, having the following advantages: the present invention is a battery rescue activating reset device using the connection line used for resetting 5 to reset the electric switch 21, to avoid an inappropriate operation resulting in incorrect action.

The fore-going preferred embodiments of the present invention are illustrated of the present invention rather than limiting of the present invention. It is intended to cover various modifications and changes included within the spirit and scope of the appended claims, the scope of which should be accorded the broadest interpretation so as to encompass all such modifications and similar structures.

What is claimed is:

1. A battery rescue activating reset device used for powering a battery, comprising:
    a power supplier;
    a control circuit, connected to the power supplier, used for controlling the power supplier to power the battery, including an electric switch used for switching the power supplier to power the battery;
    an anode connection line and a cathode connection line, connected to the control circuit at an end, the other end of the anode connection line is used for being connected to an anode end of the battery, the other end of the cathode connection line is used for being connected to a cathode end of the battery; and
    a connection line used for resetting, which is an end connected to the control circuit, the other end correspondingly disposed at the other end of the anode connection line or the other end of the cathode connection line;
    when the other end of said connection line for resetting is disposed at the other end of anode connection line, and the anode connection line is connected to the anode end of the battery, then the connection line used for resetting is connected to the anode end of the battery, and when the anode connection line is not connected to the anode end of the battery, then meanwhile the connection line used for resetting is not connected to the anode end of the battery, making the electric switch closed;
    when the other end of the connection line for resetting is disposed at the other end of the cathode line, and the cathode connection line is connected to the cathode end of the battery, the connection line used for resetting is connected to the cathode end of the battery, and when the cathode connection line is not connected to the cathode end of the battery, the connection line used for resetting is not connected to the cathode end of the battery, making the electric switch closed as well.

2. The battery rescue activating reset device of claim 1, wherein the battery is an activating battery of vehicle.

3. The battery rescue activating reset device of claim 1, wherein the reset device further comprises a case, the control circuit is housed in the case.

4. The battery rescue activating reset device of claim 1, wherein the anode connection line is connected to the anode end of the battery by an anode fixture.

5. The battery rescue activating reset device of claim 1, wherein the cathode connection line is connected to the cathode end of the battery by a cathode fixture.

6. The battery rescue activating reset device of claim 1, wherein the electric switch is a relay.

* * * * *